K. ALQUIST.
GEARING.
APPLICATION FILED JUNE 22, 1918.
1,357,674.
Patented Nov. 2, 1920.
Fig.1.
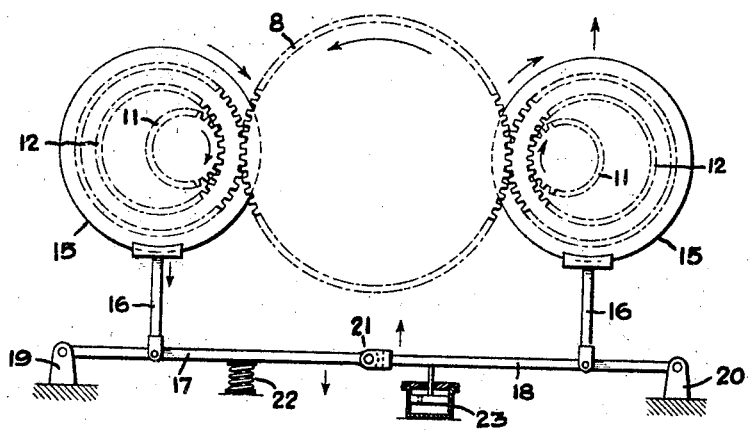
Fig.2.
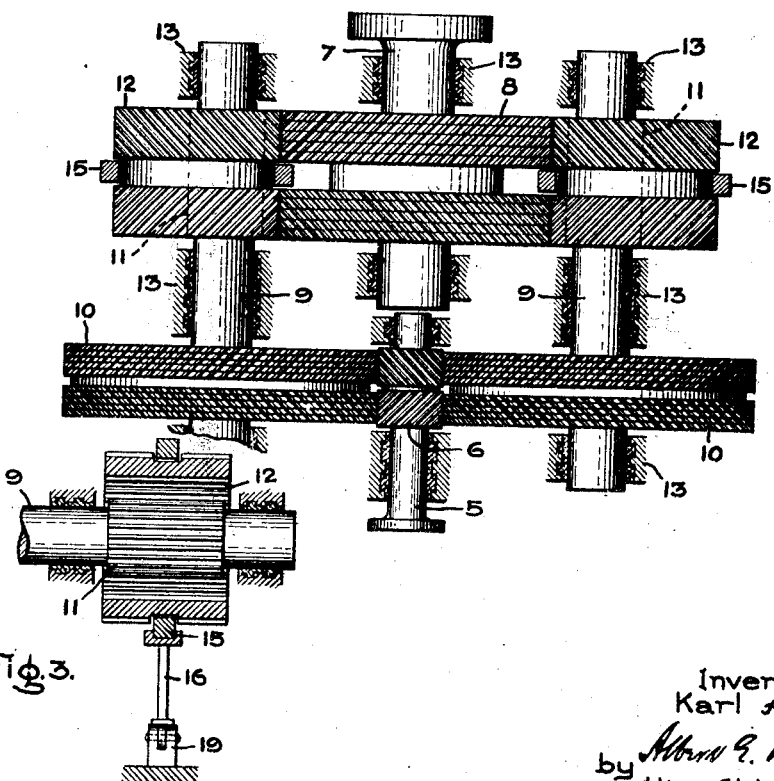
Fig.3.
Inventor:
Karl Alquist
by Albert G. Davis
His Attorney.

UNITED STATES PATENT OFFICE.

KARL ALQUIST, OF SCHENECTADY, NEW YORK.

GEARING.

1,357,674.   Specification of Letters Patent.   Patented Nov. 2, 1920.

Application filed June 22, 1918. Serial No. 241,348.

*To all whom it may concern:*

Be it known that I, KARL ALQUIST, a subject of the King of Sweden, residing at Schenectady, in the county of Schenectady, State of New York, have invented certain new and useful Improvements in Gearing, of which the following is a specification.

The present invention relates to gearing, particularly gearing intended to transmit comparatively large loads, and has for its object to provide an improved structure and arrangement in a gearing of this character.

It is well known that the pressure which can be successfully carried by a set of gear wheels having meshing teeth depends on the curvature of the tooth surfaces. The radius of the curvature increases with the diameter of the gear wheels, and the larger their diameters are, the larger the tooth pressures per unit of length may be. Taking a pinion of given diameter, it will be apparent that it reaches its greatest load carrying capacity when it meshes with a gear wheel of infinite diameter, i. e., when it meshes with a rack. However, a rack may be considered as a ring of infinite diameter, and an internally toothed ring as a gear wheel of negative diameter. And from this it follows that the load which a pinion can carry can be still further increased by having it mesh with teeth cut on the inner surface of a ring. This will be clear from the fact that the shape of such internal teeth is concave and hence fits closer to the shape of the pinion teeth. Furthermore, the more the diameter of the ring is decreased, the more concave the teeth become and the greater the load which can be transmitted.

A consideration of the foregoing has led to the use between a pinion and a gear wheel of what may be termed a gear ring, the same comprising a ring having teeth cut on its inner surface and its outer surface, the pinion meshing with the internal teeth and the gear wheel with the external teeth. Such an arrangement has the advantage that for a given load it results in a gearing having wheels of shorter length than would result if the pinion were directly in engagement with the gear wheel. This arrangement offers substantial difficulties however, in the way of obtaining and maintaining correct meshing between the gear ring and the pinion and gear wheel due to difficulty in exactly adjusting them and also due to slight inaccuracies in the formation of the teeth themselves. As will be apparent there are two closely adjacent lines of contact, one between the pinion and gear ring and the other between the gear wheel and gear ring, and while it may be possible in ordinary practice to get one such line of contact correct it is not possible to get both correct with any great degree of accuracy. The use of a gear ring introduces two additional sets of teeth, the errors in which will be added at times to those of the pinion and wheel.

Now, according to my invention, I overcome the above referred to difficulty by using in connection with the gear ring a flexible gear wheel which in itself is capable of maintaining correct meshing with the gear ring and taking care of any inaccuracies in the tooth structures. Such a flexible gear wheel may be of any suitable type, but I preferably employ one of the type invented by me and comprising a plurality of disks or plates rigidly fixed together at their central portions and slightly spaced apart at their peripheries so they may yield slightly in an axial direction under uneven tooth pressures. With this arrangement the gear ring may adjust itself solely with reference to the pinion, the gear wheel due to its flexibility being able to adjust itself to the ring.

A gear ring arrangement, as described, possesses particular advantages and utility when used in a combination wherein a high speed pinion drives a low speed gear wheel through two or more sets of intermediate gear wheels each set comprising a low speed pinion which meshes with the low speed gear wheel and a high speed gear wheel which meshes with the high speed pinion, and a further specific object of my invention is to provide an improved gearing of such character.

In the drawing, Figure 1 is a side elevation of a gearing embodying my invention; Fig. 2 is a top plan view thereof, and Fig. 3 is a detail view.

Referring to the drawing, 5 indicates a high speed shaft carrying a high speed pinion 6, and 7 indicates a low speed shaft carrying a low speed gear wheel 8. Power is transmitted from the pinion 6 to the gear wheel 8 through two sets of intermediate gear wheels, each set comprising a shaft 9 on which is mounted a high speed gear wheel 10 and a low speed pinion 11. High speed gear wheels 10 mesh with the high speed pinion 6 and low speed pinions 11 mesh with the internal teeth of gear rings 12, the external teeth of which mesh with low speed gear wheel 8. This forms a double reduction gearing, the power being transmitted in parallel through the two sets of intermediate gear wheels. The gear wheel 8 and the gear wheels 10 are shown as being of the flexible type invented by me as above referred to. The shafts 5, 7 and 9, are supported in suitable bearings 13. The gear rings 12 may be supported in fixed bearings which are adjusted to bring the gear rings to correct position to cause an equal division of the load between the two intermediate sets of gear wheels, the flexibility of the flexible gear wheels being depended upon for small adjustments during operation. I preferably, however, yieldingly support the gear rings 12 so that the gear rings may automatically adjust themselves vertically to obtain equal division of the load, and to this end the bearings for such rings may be yieldingly supported. For example, the bearings may be carried by a suitable frame which is yieldingly supported. By this means the gear rings may adjust themselves vertically, and as will be readily apparent, a variation in the vertical position of a gear ring center will produce a relative rotation between gear wheel 8 and pinion 11. The bearing pressures of the gear rings 12 are small and with a direction of rotation, as indicated by the arrows in Fig. 1, such bearing pressure will be downward in the case of the left hand gear ring 12 and upward in the case of the right hand gear ring 12. In view of this I may with advantage employ a yielding system, as shown specifically in Figs. 1 and 3, for supporting the gear rings 12. The gear rings are carried in suitable bearing rings 15 supported on the upper ends of standards 16, which in turn are pivoted at their lower ends to levers 17 and 18 respectively. Levers 17 and 18 are pivoted at one end on fixed abutments 19 and 20 and have their other ends pivoted together as indicated at 21. Beneath levers 17 and 18 is a suitable spring supporting means, as indicated at 22, which balances the weight of the various parts, and a dash-pot 23 is also preferably employed to dampen out or prevent vibrations. Now with this arrangement if the load is equally divided between the two sets of intermediate gear wheels, the bearing pressures will be equal and lever 18 will press upward at 21 with a force equal to that with which lever 17 presses downward at 21, the pressures thus equalizing each other. In case of unequal division of the load, however, the pressures on the two levers 17 and 18 will be unequal which will result in a slight adjusting movement which will position the gear rings 12 to give equal load division. With this leverage arrangement therefor it will be seen that the load will be automatically evenly divided between the two intermediate sets of gear wheels.

In carrying out my invention, I preferably employ gearing of the double helical type except in the case of the internal teeth of the gear rings 12 and pinions 11, which are preferably made straight or single helical of a small angle. This arrangement has the advantage that the low speed wheel 8 can move axially without interfering to any great extent with the high speed end of the gearing, since when such a movement occurs the gear rings 12 which must follow such movement slide freely longitudinally of pinions 11. It also has the advantage that no fine axial adjustments are required for the intermediate sets of gear wheels relative to the gear wheels with which they mesh. This is because the high speed gear wheels 10 are free to take their correct positions relative to the high speed pinion 6, the low speed pinions 11 then sliding on the gear rings.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. In combination, a pinion, a flexible gear wheel, a gear ring having internal and external teeth, said pinion meshing with the internal teeth and said gear wheel with the external teeth, and a yielding support for said gear ring.

2. In combination, a high speed pinion, a low speed gear wheel, intermediate gear wheel sets, each set comprising a high speed gear wheel and a low speed pinion, through which power is transmitted in parallel between the high speed pinion and low speed gear wheel, and gear rings interposed between some of said pinions and gear wheels, said gear rings having internal teeth which mesh with a pinion and external teeth which mesh with a gear wheel.

3. In combination, a high speed pinion, a low speed gear wheel, intermediate gear wheel sets, each set comprising a high speed gear wheel and a low speed pinion, through which power is transmitted in parallel between the high speed pinion and low speed gear wheel, gear rings interposed between some of said pinions and gear wheels, said gear rings having internal teeth which mesh with a pinion and external teeth which mesh with a gear wheel, and yielding means for supporting said gear rings.

4. In combination, a high speed pinion, a low speed gear wheel, intermediate gear wheel sets, each set comprising a high speed gear wheel and a low speed gear pinion through which power is transmitted in parallel between the high speed pinion and low speed gear wheel, and gear rings interposed between the low speed pinions and the low speed gear wheel, said gear rings having internal teeth which mesh with the pinions and external teeth which mesh with the gear wheel.

5. In combination, a high speed pinion, a low speed gear wheel, intermediate gear wheel sets, each set comprising a high speed gear wheel and a low speed gear pinion through which power is transmitted in parallel between the high speed pinion and low speed gear wheel, gear rings interposed between the low speed pinions and the low speed gear wheel, said gear rings having internal teeth which mesh with the pinions and external teeth which mesh with the gear wheel, bearings for said gear rings, and yielding means for supporting said bearings whereby the gear rings may adjust themselves vertically.

6. In combination, a high speed pinion, a low speed gear wheel, intermediate gear wheel sets, each set comprising a high speed gear wheel and a low speed pinion through which power is transmitted in parallel between the high speed pinion and low speed gear wheel, gear rings interposed between the low speed pinions and the low speed gear wheel, said gear rings having internal teeth which mesh with the pinions and external teeth which mesh with the gear wheel, bearings for said gear rings, and levers hinged to each other upon which said bearings are supported.

7. In combination, a high speed pinion, a low speed gear wheel, intermediate gear wheel sets, each set comprising a high speed gear wheel and a low speed pinion through which power is transmitted in parallel between the high speed pinion and low speed gear wheel, gear rings interposed between the low speed pinions and the low speed gear wheel, said gear rings having internal teeth which mesh with the pinions and external teeth which mesh with the gear wheel, bearings for said gear rings, levers hinged to each other upon which said bearings are supported, and spring means upon which said levers are supported.

8. In combination, a pair of toothed gear wheels, one of which is flexible and comprises a plurality of disks rigidly fixed together at their central portions and slightly spaced apart at their peripheries, and a gear ring having internal and external teeth with which said gear wheels mesh, the teeth of said flexible gear wheel and those of the ring with which they mesh being helical, and the teeth of the other gear wheel and those of the ring with which they mesh being substantially straight.

9. In combination, a pinion, a flexible gear wheel comprising a plurality of disks rigidly connected together at their central portions and slightly spaced apart at their peripheries, and a gear ring having substantially straight internal teeth and helical external teeth, said pinion having substantially straight teeth which mesh with said internal teeth, and said gear wheel having helical teeth which mesh with said external teeth.

10. In combination, a high speed pinion, a low speed gear wheel, an intermediate speed shaft, a high speed gear wheel and a low speed pinion thereon through which power is transmitted from the high speed pinion to the low speed gear wheel, and a gear ring interposed between the low speed pinion and the low speed gear wheel for transmitting power from one to the other.

11. In combination, a high speed pinion, a flexible low speed gear wheel, an intermediate speed shaft, a high speed gear wheel and a low speed pinion thereon through which power is transmitted from the high speed pinion to the low speed gear wheel, and a gear ring having internal and external teeth, interposed between the low speed pinion and the low speed gear wheel and through which power is transmitted from one to the other, the teeth on said low speed pinion and those on the ring with which they mesh being substantially straight, and the teeth on the low speed gear wheel and those on the ring with which they mesh being helical.

12. In combination, a high speed pinion, a flexible low speed gear wheel comprising a plurality of disks fixed together at their central portions and slightly spaced apart at their peripheries, an intermediate speed shaft, a high speed gear wheel and a low speed pinion thereon, through which power is transmitted from the high speed pinion to the low speed gear wheel, and a gear ring having internal and external teeth interposed between the low speed pinion and low speed gear wheel and through which power is transmitted from one to the other, the teeth on said low speed pinion and those on the ring with which they mesh being substantially straight, and the teeth on the low speed gear wheel and those on the ring with which they mesh being helical.

In witness whereof, I have hereunto set my hand this 20th day of June 1918.

KARL ALQUIST.